(12) United States Patent
Doi et al.

(10) Patent No.: US 11,443,895 B2
(45) Date of Patent: Sep. 13, 2022

(54) MULTILAYER CERAMIC CAPACITOR

(71) Applicant: Murata Manufacturing Co., Ltd., Nagaokakyo (JP)

(72) Inventors: Akitaka Doi, Nagaokakyo (JP); Akito Mori, Nagaokakyo (JP); Kazuhisa Uchida, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 407 days.

(21) Appl. No.: 16/822,068

(22) Filed: Mar. 18, 2020

(65) Prior Publication Data
US 2020/0312555 A1   Oct. 1, 2020

(30) Foreign Application Priority Data

Mar. 28, 2019   (JP) .............................. JP2019-064072

(51) Int. Cl.
| | | |
|---|---|---|
| *H01G 4/12* | (2006.01) | |
| *H01G 4/232* | (2006.01) | |
| *H01G 4/012* | (2006.01) | |
| *H01G 4/30* | (2006.01) | |

(52) U.S. Cl.
CPC .......... *H01G 4/1227* (2013.01); *H01G 4/012* (2013.01); *H01G 4/2325* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 11,094,462 | B2* | 8/2021 | Fukunaga | ............... H01G 4/224 |
| 11,315,736 | B2* | 4/2022 | Yao | ........................ H01G 4/248 |
| 2006/0043523 | A1 | 3/2006 | Ito et al. | |
| 2015/0340155 | A1* | 11/2015 | Fukunaga | ................ H01G 4/30 |
| | | | | 361/301.4 |
| 2020/0066446 | A1* | 2/2020 | Fukunaga | ............ H01G 4/0085 |

(Continued)

FOREIGN PATENT DOCUMENTS

JP         2006-073623 A      3/2006

OTHER PUBLICATIONS

Kimura, "Multilayer Ceramic Capacitor", U.S. Appl. No. 16/822,064, filed Mar. 18, 2020.

(Continued)

*Primary Examiner* — Nathan Milakovich
(74) *Attorney, Agent, or Firm* — Keating & Bennett, LLP (57) ABSTRACT

A multilayer ceramic capacitor includes a laminate including a dielectric ceramic layer and first and second electrode layers laminated in a lamination direction, and first and second external electrodes respectively connected to the first and second internal electrode layers. The laminate includes a central layer portion, a peripheral layer portion sandwiching the central layer portion, and a side margin sandwiching the central layer portion and the peripheral layer portion. The first and second internal electrode layers and the first and second external electrodes include Ni. In a cross section including the lamination direction and a width direction, a Ni content of the peripheral layer portion is larger at a surface portion than at a central portion in a thickness direction, and a Ni content of the side margin is larger at a surface portion than at a central portion in a thickness direction of the side margin.

18 Claims, 6 Drawing Sheets

(56) References Cited

U.S. PATENT DOCUMENTS

2020/0118746 A1* 4/2020 Matsui .................. H01G 4/012
2020/0118747 A1* 4/2020 Muramatsu ............ H01G 4/012
2022/0076891 A1* 3/2022 Han ...................... H01G 4/008

OTHER PUBLICATIONS

Yokomizo et al., "Multilayer Ceramic Capacitor", U.S. Appl. No. 16/822,065, filed Mar. 18, 2020.
Sakai, "Multilayer Ceramic Capacitor", U.S. Appl. No. 16/822,067, filed Mar. 18, 2020.
Harada et al., "Multilayer Ceramic Capacitor", U.S. Appl. No. 16/822,069, filed Mar. 18, 2020.
Uchida, "Multilayer Ceramic Capacitor", U.S. Appl. No. 16/822,070, filed Mar. 18, 2020.

* cited by examiner

MULTILAYER CERAMIC CAPACITOR

CROSS REFERENCE TO RELATED APPLICATIONS

This application claims the benefit of priority to Japanese Patent Application No. 2019-064072 filed on Mar. 28, 2019. The entire contents of this application are hereby incorporated herein by reference.

BACKGROUND OF THE INVENTION

1. Field of the Invention

The present invention relates to a multilayer ceramic capacitor.

2. Description of the Related Art

For example, JP 2006-73623 A describes, as a method of producing a multilayer ceramic capacitor, a method of alternately laminating green sheets and internal electrode layers before sintering to form a green chip, sintering the green chip, and then forming an external electrode on an end surface of a capacitor element body.

In recent years, large-capacitance and small-sized multilayer ceramic capacitors have been demanded. In order to achieve such a multilayer ceramic capacitor, it is effective to increase effective areas of internal electrode layers occupying green sheets, that is, the areas of the internal electrode layers that oppose each other.

In the method described in JP 2006-73623 A, it is necessary to secure a large margin for cutting in consideration of the printing accuracy of the internal electrode layers and the lamination accuracy of the green sheets. Therefore, the method is disadvantageous in producing a large-capacitance and small-size multilayer ceramic capacitor.

Therefore, a method of forming a dielectric ceramic layer called a side margin on a lateral surface of a green chip has been proposed. Specifically, ceramic green sheets each having a raw internal electrode layer disposed on the surface thereof are laminated to form a mother block, and then the mother block is cut to produce a green chip. When the green chip is produced, the mother block is cut such that the internal electrode layer is exposed on a lateral surface on which no external electrode is formed. For example, the side margin is formed by bonding a ceramic green sheet to a lateral surface of the cut green chip. According to the method, the internal electrode layer can be formed over the entire width of the green chip, so that a large-capacitance and small-size multilayer ceramic capacitor can be produced.

However, when the side margin becomes thin, a crack may occur in a sintered laminate due to the difference in shrinkage between the side margin and the dielectric ceramic layer sandwiched between the internal electrode layers in a sintering step.

SUMMARY OF THE INVENTION

Preferred embodiments of the present invention provide multilayer ceramic capacitors each including a laminate that is less prone to cracking.

A multilayer ceramic capacitor according to a preferred embodiment of the present invention includes a laminate including a dielectric ceramic layer and an internal electrode layer that are laminated in a lamination direction; and an external electrode connected to the internal electrode layer, the laminate including a first main surface and a second main surface that oppose each other in the lamination direction, a first lateral surface and a second lateral surface that oppose each other in a width direction perpendicular or substantially perpendicular to the lamination direction, and a first end surface and a second end surface that oppose each other in a length direction perpendicular or substantially perpendicular to the lamination direction and the width direction, the internal electrode layer including a first internal electrode layer extending to the first end surface and a second internal electrode layer extending to the second end surface so as to oppose the first internal electrode layer with the dielectric ceramic layer therebetween, the external electrode including a first external electrode disposed on the first end surface and connected to the first internal electrode layer, and a second external electrode disposed on the second end surface and connected to the second internal electrode layer, the laminate including a central layer portion in which the first internal electrode layer and the second internal electrode layer are alternately laminated with the dielectric ceramic layer therebetween, a peripheral layer portion sandwiching the central layer portion in the lamination direction and made of a ceramic material, and a side margin sandwiching the central layer portion and the peripheral layer portion in the width direction and made of a ceramic material, the side margin including an inner layer on an innermost side in the width direction and an outer layer on an outermost side in the width direction, the first internal electrode layer, the second internal electrode layer, the first external electrode, and the second external electrode including Ni, the first external electrode being disposed on the first end surface and extending therefrom on the first main surface, the second main surface, the first lateral surface, and the second lateral surface, and in the cross section including a lamination direction and the width direction which is obtained by cutting the laminate and the first external electrode at a central portion in a length direction of an extending portion of the first external electrode which extends on the first main surface, a Ni content of the peripheral layer portion being larger at a surface portion in a thickness direction of the peripheral layer portion than a Ni content at a central portion in the thickness direction of the peripheral layer portion, and a Ni content of the side margin being larger at a surface portion in a thickness direction of the side margin than a Ni content at a central portion in the thickness direction of the side margin.

Multilayer ceramic capacitors according to preferred embodiments of the present invention each include a laminate that is less prone to cracking.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic capacitors according to preferred embodiments of the present invention will be described in detail below with reference to the drawings.

The present invention is not limited to the following preferred embodiments, and may be suitably modified without departing from the gist of the present invention. Combinations of two or more preferred features described in the following preferred embodiments are also within the scope of the present invention.

Multilayer Ceramic Capacitor

Figure 1:
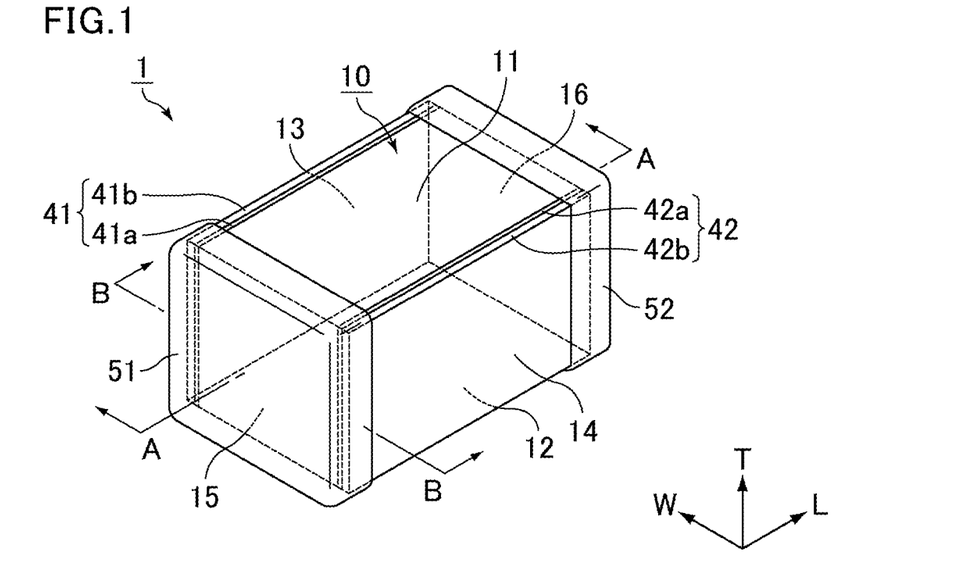
FIG. 1 is a perspective view schematically showing an example of a multilayer ceramic capacitor according to a preferred embodiment of the present invention.
Figure 2:
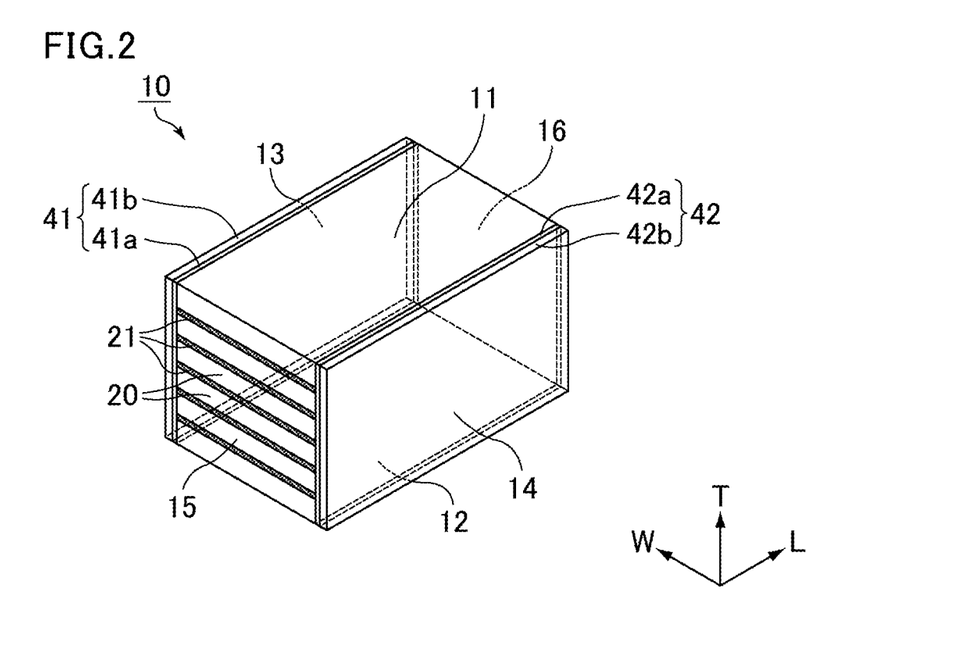
FIG. 2 is a perspective view schematically showing an example of a laminate defining the multilayer ceramic capacitor shown in FIG. 1.
Figure 3:
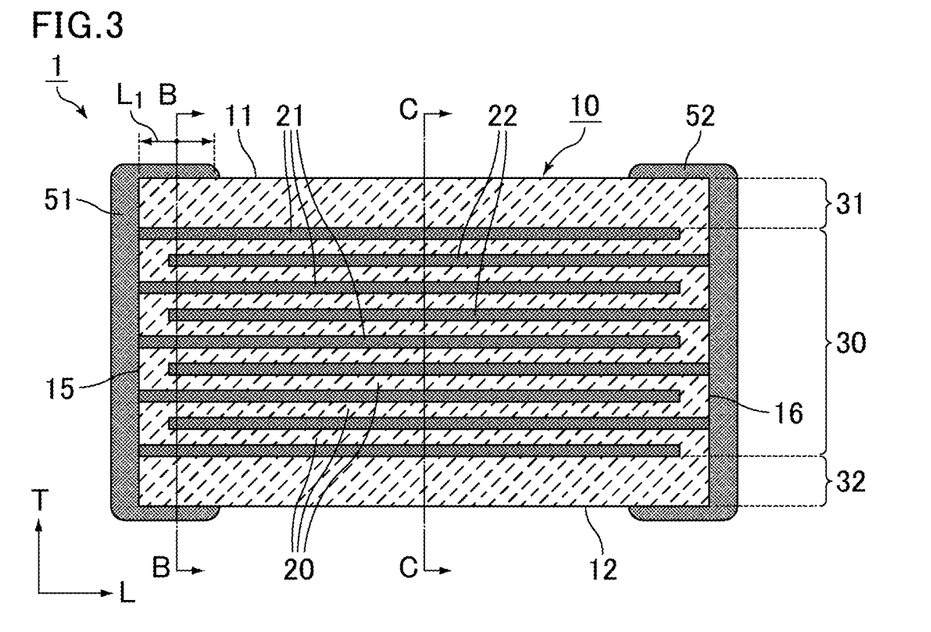
FIG. 3 is a cross-sectional view taken along the line A-A of the multilayer ceramic capacitor shown in FIG. 1.
Figure 4:
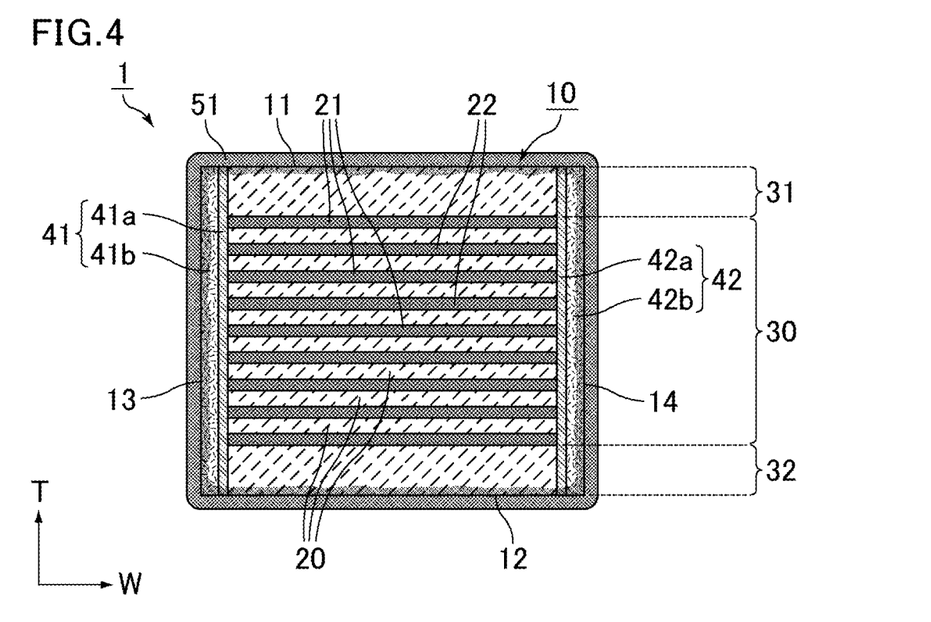
FIG. 4 is a cross-sectional view taken along the line B-B of the multilayer ceramic capacitor shown in FIG. 1.

FIG. 1 is a perspective view schematically showing an example of a multilayer ceramic capacitor according to a preferred embodiment of the present invention. FIG. 2 is a perspective view schematically showing an example of a laminate defining the multilayer ceramic capacitor shown in FIG. 1. FIG. 3 is a cross-sectional view taken along the line A-A of the multilayer ceramic capacitor shown in FIG. 1. FIG. 4 is a cross-sectional view taken along the line B-B of the multilayer ceramic capacitor shown in FIG. 1.

Herein, the lamination direction, the width direction, and the length direction of the multilayer ceramic capacitor and the laminate indicate directions specified by arrows T, W, and L, respectively, in a multilayer ceramic capacitor 1 shown in FIG. 1 and a laminate 10 shown in FIG. 2. The lamination (T) direction, the width (W) direction, and the length (L) direction are perpendicular or substantially perpendicular to each other. The lamination (T) direction is a direction in which multiple dielectric ceramic layers 20 and multiple pairs of a first internal electrode layer 21 and a second internal electrode layer 22 are laminated.

The multilayer ceramic capacitor 1 shown in FIG. 1 includes the laminate 10, a first external electrode 51 on one end surface of the laminate 10, and a second external electrode 52 on the other end surface of the laminate 10.

As shown in FIG. 2, the laminate 10 is a rectangular parallelepiped or a substantially rectangular parallelepiped. The laminate 10 includes a first main surface 11 and a second main surface 12 that oppose each other in the lamination (T) direction, a first lateral surface 13 and a second lateral surface 14 that oppose each other in the width (W) direction perpendicular or substantially perpendicular to the lamination (T) direction, and a first end surface 15 and a second end surface 16 that oppose each other in the length (L) direction perpendicular or substantially perpendicular to the lamination (T) direction and the width (W) direction.

Herein, a cross section of the multilayer ceramic capacitor 1 or the laminate 10 perpendicular or substantially perpendicular to the first end surface 15 and the second end surface 16 and parallel or substantially parallel to the lamination (T) direction is referred to as an LT cross section that is a cross section in the length (L) direction and the lamination (T) direction. A cross section of the multilayer ceramic capacitor 1 or the laminate 10 perpendicular or substantially perpendicular to the first lateral surface 13 and the second lateral surface 14 and parallel or substantially parallel to the lamination (T) direction is referred to as a WT cross section that is a cross section in the width (W) direction and the lamination (T) direction. A cross section of the multilayer ceramic capacitor 1 or the laminate 10 perpendicular or substantially perpendicular to the first lateral surface 13, the second lateral surface 14, the first end surface 15, and the second end surface 16, and perpendicular or substantially perpendicular to the lamination (T) direction is referred to as an LW cross section that is a cross section in the length (L) direction and the width (W) direction. Thus, FIG. 3 shows the LT cross section of the multilayer ceramic capacitor 1, and FIG. 4 shows the WT cross section of the multilayer ceramic capacitor 1.

In the laminate 10, corners and edges are preferably rounded. The corner is a portion where three surfaces of the laminate meet, and the edge is a portion where two surfaces of the laminate meet.

As shown in FIG. 2, FIG. 3, and FIG. 4, the laminate 10 has a laminated structure including the multiple dielectric ceramic layers 20 laminated in the lamination (T) direction, and the first internal electrode layers 21 and the second internal electrode layers 22 which are each provided along interfaces between the dielectric ceramic layers 20. The dielectric ceramic layers 20 extend in the width (W) direction and the length (L) direction, and the first internal electrode layers 21 and the second internal electrode layers 22 each extend flatly along the dielectric ceramic layer 20.

The first internal electrode layers 21 extend to the first end surface 15 of the laminate 10. The second internal electrode layers 22 extend to the second end surface 16 of the laminate 10.

Each first internal electrode layer 21 and each second internal electrode layer 22 oppose each other with the dielectric ceramic layer 20 therebetween in the lamination (T) direction. Capacitance is generated from each portion where the first internal electrode layer 21 and the second internal electrode layer 22 oppose each other with the dielectric ceramic layer 20 therebetween.

The first internal electrode layers 21 and the second internal electrode layers 22 each preferably include Ni, for example. In addition to the one or more metals, the first internal electrode layers 21 and the second internal electrode layers 22 may each include the same dielectric ceramic material as that of the dielectric ceramic layers 20.

The first external electrode 51 is on the first end surface 15 of the laminate 10. In FIG. 1, the first external electrode 51 includes a portion extending onto a portion of each of the first main surface 11, the second main surface 12, the first lateral surface 13, and the second lateral surface 14. The first external electrode 51 is connected to the first internal electrode layers 21 on the first end surface 15.

The second external electrode 52 is on the second end surface 16 of the laminate 10. In FIG. 1, the second external electrode 52 includes a portion extending onto a portion of each of the first main surface 11, the second main surface 12, the first lateral surface 13, and the second lateral surface 14. The second external electrode 52 is connected to the second internal electrode layers 22 on the second end surface 16.

Each of the first external electrode 51 and the second external electrode 52 preferably includes Ni, for example. Each of the first external electrode 51 and the second external electrode 52 preferably includes a Ni layer including Ni and a ceramic material. The Ni layer is a base electrode layer. Such a Ni layer can be formed by a co-fire method in which the Ni layer is sintered simultaneously with the first internal electrode layer 21 and the second internal electrode layer 22.

Further, the Ni layer including Ni and the ceramic material which defines the external electrode is preferably directly disposed on the laminate.

The direct arrangement of the Ni layer including Ni on the laminate enables diffusion of Ni into an outer layer and a side margin as described later and to increase the Ni content of the surface portion of the outer layer and the Ni content of the surface portion of the side margin.

Elements included in the ceramic material in the Ni layer are preferably the same as elements included in a ceramic material included in an outer layer described later.

When the elements included in the ceramic material in the Ni layer are the same or substantially the same as the elements included in the ceramic material included in the outer layer, sintering behaviors of the outer layer and the Ni layer are closer to each other when a paste for forming the external electrode is applied to the laminate and sintered, thus improving the adhesion between the outer layer and the Ni layer.

The case where the elements included in the ceramic material in the Ni layer are the same or substantially the same as the elements included in the ceramic material included in the outer layer means that all elements detected from the dielectric ceramic defining the outer layer are detected in the Ni layer.

Examples of the elements included in the ceramic material include Ti, Ba, and rare earth elements when a main component of the dielectric ceramic defining the outer layer is $BaTiO_3$.

The types of elements included in the first external electrode 51 and the second external electrode 52 can be determined by elemental analysis by transmission electron microscope-energy dispersive X-ray spectroscopy (TEM-EDX).

The ceramic material is preferably present in the Ni layer in an amount of about 25 area % or more and about 40 area % or less, for example.

When the amount of the ceramic material in the Ni layer is about 25 area % or more, a certain amount or more of the ceramic material is present in the Ni layer, and the external electrode including the Ni layer including the ceramic material of the certain amount or more can be formed by sintering the external electrode paste simultaneously with the laminate.

Further, the amount of the ceramic material in the Ni layer is preferably about 35 area % or less, for example.

The amount of the ceramic material in the Ni layer is measured by the following method using a wavelength dispersive X-ray analyzer (WDX). First, a cross section of a central portion in a width (W) direction of the multilayer ceramic capacitor 1 is exposed, and a central portion of the thickness of the Ni layer at a central portion in a lamination (T) direction of the laminate 10 is magnified by 10,000 times. A field of view of a magnified area is set to about 6 μm×about 8 μm, for example. Then, the magnified area is mapped by WDX, and an area ratio is measured from an image obtained by the mapping.

The first external electrode 51 preferably includes a Ni layer, a first plating layer, and a second plating layer in order from a first end surface 15 side of the laminate 10. Similarly, the second external electrode 52 preferably includes a Ni layer, a first plating layer, and a second plating layer in order from a second end surface 16 side of the laminate 10. The first plating layer is preferably provided by Ni plating, and the second plating layer is preferably provided by Sn plating, for example. Each of the first external electrode 51 and the second external electrode may include a conductive resin layer including conductive particles and a resin between the Ni layer and the first plating layer. Examples of the conductive particles in the conductive resin layer include metal particles of Cu, Ag, Ni or the like.

As shown in FIG. 3 and FIG. 4, the laminate 10 includes a central layer portion 30 in which each first internal electrode layer 21 and each second internal electrode layer 22 oppose each other with the dielectric ceramic layer 20 therebetween, peripheral layer portions 31 and 32 sandwiching the central layer portion 30 in the lamination (T) direction, and side margins 41 and 42 sandwiching the central layer portion 30, the peripheral layer portion 31, and the peripheral layer portion 32 in the width (W) direction. In FIG. 3 and FIG. 4, the central layer portion 30 is a region that is sandwiched by the first internal electrode layer 21 closest to the first main surface 11 and the first internal electrode layer 21 closest to the second main surface 12 in the lamination (T) direction. Although not shown, the peripheral layer portion 31 and the peripheral layer portion 32 each preferably include the multiple dielectric ceramic layers 20 laminated in the lamination (T) direction.

The dielectric ceramic layers 20 defining the central layer portion 30 are preferably made of, for example, a dielectric ceramic material mainly including $BaTiO_3$ or the like. The dielectric ceramic layers 20 defining the central layer portion 30 may further include a sintering aid element.

The dielectric ceramic layers 20 defining the peripheral layer portion 31 and the peripheral layer portion 32 are preferably made of a ceramic material such as, for example, a dielectric ceramic material mainly including $BaTiO_3$ or the like. The dielectric ceramic layers 20 defining the peripheral layer portion and the peripheral layer portion 32 may further include a sintering aid element.

The dielectric ceramic layers 20 defining the peripheral layer portion 31 and the peripheral layer portion 32 are preferably made of the same dielectric ceramic material as that of the dielectric ceramic layers 20 defining the central layer portion 30, but may be made of a dielectric ceramic material different from that of the dielectric ceramic layers 20 defining the central layer portion 30.

The peripheral layer portions 31 and 32 each preferably have a thickness of about 15 μm or more and about 40 μm or less, for example. The peripheral layer portions 31 and 32 may each have a multilayer structure or a single-layer structure.

The side margin 41 and the side margin 42 each include multiple ceramic layers laminated in the width (W) direction.

Among the ceramic layers, a layer on an innermost side in the width direction is referred to as an inner layer, and a layer on an outermost side in the width direction is referred to as an outer layer.

In FIG. 4, the side margin 41 has a two-layered structure of the ceramic layers including an inner layer 41a closest to the laminate 10 and an outer layer 41b farthest from the laminate 10. Similarly, the side margin 42 has a two-layered structure of the ceramic layers including an inner layer 42a closest to the laminate 10 and an outer layer 42b farthest from the laminate 10. Each side margin is not limited to the two-layered structure, and may be a three- or more layered structure. When the side margin includes three- or more ceramic layers, a ceramic layer on an innermost side in the width direction is an inner layer, and other ceramic layers including a ceramic layer on an outermost side in the width direction are outer layers.

The number of ceramic layers may be different between the side margin on the first lateral surface side of the laminate and the side margin on the second lateral surface side of the laminate.

When the side margin has a two-layered structure including the inner layer and the outer layer, since the inner layer and the outer layer have different sinterability, observation of these layers using an optical microscope in a dark field can confirm that the structure is indeed a two-layered structure. The same applies when the side margin has a three- or more layered structure.

The inner layer 41a and the inner layer 42a are preferably made of a ceramic material such as, for example, a dielectric ceramic material mainly including $BaTiO_3$ or the like. The inner layer 41a and the inner layer 42a may further include Si that defines and functions as a sintering aid element.

The inner layer 41a and the inner layer 42a are preferably made of the same dielectric ceramic material as that of the dielectric ceramic layers 20 defining the central layer portion 30, the peripheral layer portion 31, and the peripheral layer portion 32, but may be made of a dielectric ceramic material different from that of the dielectric ceramic layers 20 defining the central layer portion 30, the peripheral layer portion 31, and the peripheral layer portion 32.

The outer layer 41b and the outer layer 42b are preferably made of, for example, a dielectric ceramic material mainly including $BaTiO_3$ or the like.

The outer layer 41b and the outer layer 42b may further include Si that defines and functions as a sintering aid element.

The outer layer 41b and the outer layer 42b may be made of the same dielectric ceramic material as that of the inner layer 41a and the inner layer 42a, but may be made of a dielectric ceramic material different from that of the inner layer 41a and the inner layer 42a. The outer layer 41b and the outer layer 42b may be made of the same dielectric ceramic material as that of the dielectric ceramic layers 20 defining the central layer portion 30, the peripheral layer portion 31, and the peripheral layer portion 32, but may be made of a dielectric ceramic material different from that of the dielectric ceramic layers 20 defining the central layer portion 30, the peripheral layer portion 31, and the peripheral layer portion 32.

FIG. 4 shows a cross section including a lamination direction and a width direction of the multilayer ceramic capacitor which is obtained by cutting the laminate 10 and the first external electrode 51 at a central portion in a length direction of an extending portion of the first external electrode 51 which extends on the first main surface 11.

In the cross section, the Ni contents of the peripheral layer portion 31 and the peripheral layer portion 32 are larger at the surface portions in the thickness direction thereof than those at the central portions in the thickness direction thereof, and the Ni contents of the side margin 41 and the side margin 42 are larger at the surface portions in the thickness direction thereof than those at the central portions in the thickness direction thereof.

Presumably, the Ni contents have such a relationship because Ni included in the first external electrode 51 diffuses into the peripheral layer portion 31, the peripheral layer portion 32, the side margin 41, and the side margin 42 (the outer layer 41b and the outer layer 42b).

FIG. 4 schematically shows a state where Ni included in the first external electrode 51 diffuses into the peripheral layer portion 31, the peripheral layer portion 32, the side margin 41, and the side margin 42 with different hatching patterns of the surface portions in the thickness direction of the peripheral layer portion 31 and the peripheral layer portion 32 and the surface portions in the thickness direction of the side margin 41 and the side margin 42 (the outer layer 41b and the outer layer 42b). This matter will be hereunder described.

The Ni content at each point is measured by polishing the cross section of the multilayer ceramic capacitor so that the WT cross section of the multilayer ceramic capacitor is exposed, and detecting Ni by composition analysis based on EDX. The polishing of the cross section is performed up to the central portion in the length direction of the extending portion of the first external electrode which extends on the first main surface. The position corresponds to about half of a width indicated by a double-headed arrow $L_1$ in FIG. 3, and it corresponds to an intermediate position between a first end surface 15 and an end portion of the first external electrode 51 extending on the first main surface 11.

The Ni content at the surface portion in the thickness direction of the peripheral layer portion is measured at a point up to about 1 μm from the surface of the laminate. On the other hand, the Ni content at the central portion in the thickness direction of the peripheral layer portion is measured near the center of the thickness of the peripheral layer portion.

The Ni content at the surface portion in the thickness direction of the side margin is measured at a point up to about 1 μm from the surface of the laminate. On the other hand, the Ni content at the central portion in the thickness direction of the side margin is measured near the center of the thickness of the side margin.

Ni reduces or prevents grain growth of ceramic particles defining the dielectric ceramic layer. It can be said that Ni sufficiently diffuses in the dielectric ceramic layer of the inner layer portion sandwiched between the internal electrode layers including Ni, but diffusion of Ni from the internal electrode layer into the dielectric ceramic layer of the peripheral layer portion only slightly occurs. Furthermore, diffusion of Ni from the internal electrode layer into the side margin, especially into the outer layer only slightly occurs.

Therefore, the Ni content of the peripheral layer portion and the Ni content of the side margin can be increased by diffusing Ni from the external electrode into the peripheral layer portion and the side margin, such that the grain growth of the ceramic particles defining the peripheral layer portion and the side margin can be reduced or prevented.

As a result, the shrinkage behavior of the dielectric ceramic layer of the central layer portion can be matched with the shrinkage behaviors of the peripheral layer portion and the side margin, which results in a multilayer ceramic capacitor including a laminate that is less prone to cracking.

The relationship of the Ni contents has been described by exemplifying a case where the measurement is performed at the central portion in the length direction of the extending portion of the first external electrode which extends on the first main surface. The Ni contents may also satisfy the above-described rule in a case where measurement is performed at a central portion in the length direction of an extending portion of the second external electrode which extends on the first main surface.

In other words, on the second external electrode side, the Ni contents of the peripheral layer portion 31 and the peripheral layer portion 32 may be larger at the surface portions in the thickness direction thereof than those at the central portions in the thickness direction thereof, and the Ni contents of the side margin 41 and the side margin 42 may be larger at the surface portions in the thickness direction thereof than those at the central portions in the thickness direction thereof.

The relationship of the Ni contents is measured on both the first external electrode side and the second external electrode side. When the relationship of the Ni contents satisfies the above relationship on one of the external electrode sides, the external electrode on the side satisfying the rule is regarded as the first external electrode, and the multilayer ceramic capacitor satisfying the above relationship is included in the multilayer ceramic capacitor of the present invention.

Furthermore, when the relationship of the Ni contents satisfies the above relationship on both the first external electrode side and the second external electrode side, the multilayer ceramic capacitor satisfying the above relationship is included in the multilayer ceramic capacitor according to the present preferred embodiment.

Figure 5:
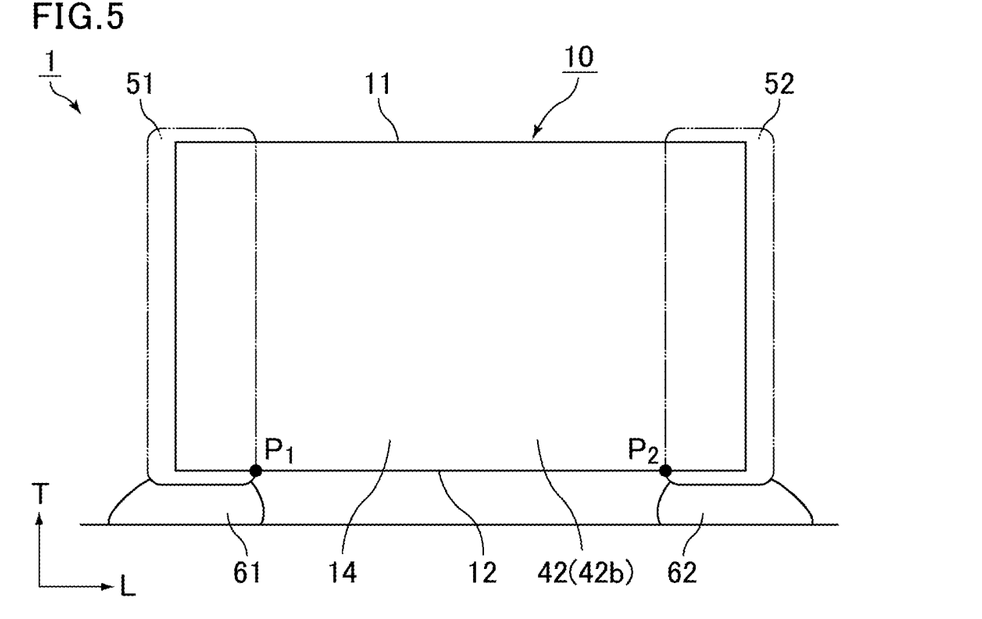
FIG. 5 is a side view schematically showing a location where a crack is assumed to occur in a multilayer ceramic capacitor.

FIG. 5 is a side view schematically showing a location where a crack is assumed to occur in the multilayer ceramic capacitor.

When the external electrode 51 and the external electrode 52 of the multilayer ceramic capacitor 1 shown in FIG. 5 are mounted with solder 61 and solder 62, respectively, force is likely to be applied to a point $P_1$ and a point $P_2$ which are tips of extending portions of the external electrode 51 and the external electrode 52 which extend on the second main surface 12 as a mount surface.

If the shrinkage behavior of the dielectric ceramic layer of the central layer does not match the shrinkage behaviors of the peripheral layer portion and the side margin, the peripheral layer portion and the side margin are prone to cracking. If cracks occur in the peripheral layer portion and the side margin of the laminate, the multilayer ceramic capacitor is likely to break from the portions indicated by the points $P_1$ and $P_2$ when the multilayer ceramic capacitor is mounted.

Therefore, a multilayer ceramic capacitor in which a laminate is less prone to cracking by matching the shrinkage behavior of the dielectric ceramic layer of the central layer portion with the shrinkage behaviors of the peripheral layer portion and the side margin can be prevented from breaking after mounting.

In the multilayer ceramic capacitor, the thickness of each of the first internal electrode layer and the second internal electrode layer is preferably about 0.4 μm or less, for example.

Furthermore, the thickness of each of the first internal electrode layer and the second internal electrode layer is preferably about 0.38 μm or less, for example.

Furthermore, the thickness of each of the first internal electrode and the second internal electrode layer is preferably about 0.25 μm or more, for example.

The thickness of the dielectric ceramic layer is preferably about 0.55 μm or less, for example.

Furthermore, the thickness of the dielectric ceramic layer is preferably about 0.4 μm or more, for example.

Here, the thickness of the dielectric ceramic layer means the thickness of the dielectric ceramic layer located between the internal electrode layers, that is, the thickness of the dielectric ceramic layer in the central layer portion.

The thicknesses of the internal electrode layer and the dielectric ceramic layer are determined as follows.

Figure 6:
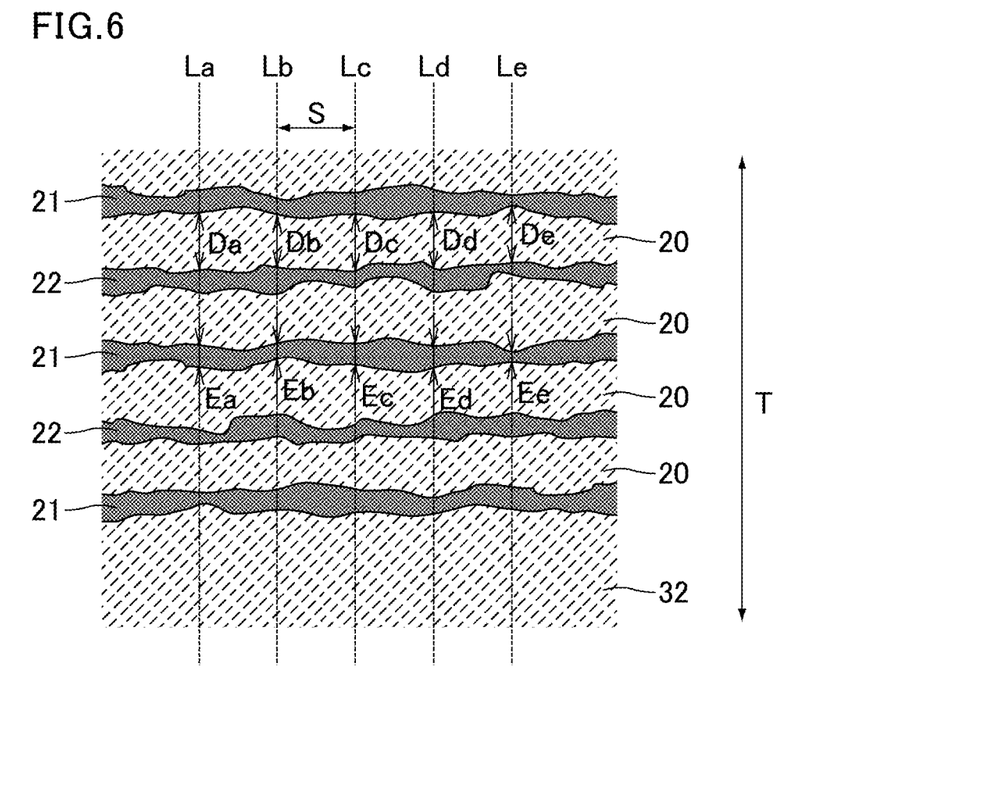
FIG. 6 is a view schematically showing a method of determining the thicknesses of an internal electrode layer and a dielectric ceramic layer.

FIG. 6 is a diagram schematically showing a method of determining the thicknesses of the internal electrode layer and the dielectric ceramic layer.

The diagram is a portion of a WT cross-sectional view passing through the center in a length direction of the multilayer ceramic capacitor, and corresponds to a portion of a cross-sectional view taken along the line C-C in FIG. 3.

First, the WT cross section passing through the center in a length direction of the multilayer ceramic capacitor is exposed by polishing. If necessary, the polished surface is etched to remove the internal electrode stretched by polishing. Then, the exposed cross section is observed with a scanning electron microscope.

A straight line Lc extending in a lamination direction of the laminate and passing through the center or approximate center of the laminate is drawn. Next, multiple straight lines parallel or substantially parallel to the straight line Lc are drawn at equal or substantially equal intervals (pitch S). The pitch S may be determined to be, for example, about 5 to about 10 times the thickness of the dielectric ceramic layer or the internal electrode layer to be measured. For example, when the thickness of a dielectric ceramic layer having a thickness of about 1 μm is measured, the pitch S is set to about 5 μm. Furthermore, the same number of straight lines is respectively drawn on both sides of the straight line Lc. In other words, an odd number of straight lines including the straight line Lc are drawn. FIG. 6 shows five straight lines of a straight line La to a straight line Le.

Next, the thicknesses of the dielectric ceramic layer and the internal electrode layer are measured on each of the straight lines La to Le. When on each of the straight lines La to Le, an internal electrode layer is defective and thus the dielectric ceramic layers sandwiching the internal electrode layer are connected to each other, or when an enlarged image of a measurement position is unclear, the thickness or the distance is measured on a straight line which is farther away from the straight line Lc.

For example, when the thickness of the dielectric ceramic layer is measured, the thickness Da on the straight line La, the thickness Db on the straight line Lb, the thickness Dc on the straight line Lc, the thickness Dd on the straight line Ld, and the thickness De on the straight line Le are measured as shown in FIG. 6, and the average value of these thicknesses is defined as the thickness of the dielectric ceramic layer.

Similarly, when the thickness of the internal electrode layer is measured, the thickness Ea on the straight line La, the thickness Eb on the straight line Lb, the thickness Ec on the straight line Lc, the thickness Ed on the straight line Ld, and the thickness Ee on the straight line Le are measured as shown in FIG. 6, and the average value of these thicknesses is defined as the thickness of the internal electrode layer.

The average thickness of dielectric ceramic layers and the average thickness of internal electrode layers are each measured, for example, as follows. The thicknesses are measured according to the foregoing method for five dielectric ceramic layers (five internal electrode layers) including a dielectric ceramic layer (an internal electrode layer) substantially at the center in the lamination direction T and two dielectric ceramic layers (two internal electrode layers) on each side thereof. The measured thicknesses are averaged to obtain the average thickness of the dielectric ceramic layers (the internal electrode layers). When the lamination number of the dielectric ceramic layers (the internal electrode layers) is less than 5, the thicknesses of all of the dielectric ceramic layers (all of the internal electrode layers) are measured according to the above-described method and are averaged to obtain the average thickness of dielectric ceramic layers (internal electrode layers).

In consideration of the fact that the thicknesses of the dielectric ceramic layers and the thicknesses of the internal electrode layers are measured as described above, the following dimensions may be preferred dimensions of the multilayer ceramic capacitor.

Type 1
  Dimension in length direction: about 0.32 mm or more and about 0.36 mm or less
  Dimension in width direction: about 0.25 mm or more and about 0.30 mm or less
  Dimension in lamination direction: about 0.25 mm or more and about 0.30 mm or less
  Thickness of dielectric ceramic layer: about 4.7 µm or more and about 5.7 µm or less
  Thickness of internal electrode layer: about 0.9 µm or more and about 1.1 µm or less Type 2
  Dimension in length direction: about 0.1 mm or more and about 0.12 mm or less
  Dimension in width direction: about 0.63 mm or more and about 0.68 mm or less
  Dimension in lamination direction: about 0.62 mm or more and about 0.68 mm or less
  Thickness of dielectric ceramic layer: about 1.1 µm or more and about 1.5 µm or less
  Thickness of internal electrode layer: about 0.63 µm or more and about 0.75 µm or less In each of Types 1 and 2, the withstand voltage is improved by increasing the thickness of the dielectric ceramic layer. On the other hand, by minimizing the side margin, the effective area in which elastic capacitance is generated can be increased or maximized. Furthermore, in the L gap, a step occurs usually due to a difference in thickness between the dielectric ceramic layer and the internal electrode layer, and the internal electrode layer is curved in the lamination direction when lamination is performed. At a curved portion, an electric field is concentrated, which leads to a reduction in reliability. When the dielectric ceramic layer is formed such that the difference in thickness between the dielectric ceramic layer and the internal electrode layer is compensated for, the internal electrode layer can be prevented from being curved and the reliability can be improved.

In view of maintaining the shape and performance of the multilayer ceramic capacitor 1, the inner layer 41a is preferably thinner than the outer layer 41b. Similarly, the inner layer 42a is preferably thinner than the outer layer 42b.

The inner layers 41a and 42a each preferably have a thickness of about 0.1 µm or more and about 20 µm or less, for example. The inner layers 41a and 42a preferably have the same or substantially the same thickness.

The outer layers 41b and 42b each preferably have a thickness of about 5 µm or more and about 20 µm or less, for example. The outer layers 41b and 42b preferably have the same or substantially the same thickness.

The side margins 41 and 42 each preferably have a thickness of about 5 µm or more and about 40 µm or less, and more preferably about 5 µm or more and about 20 µm or less, for example. The side margins 41 and 42 preferably have the same or substantially the same thickness. The outer layer 41b is preferably thicker than the inner layer 41a while the inner layer 41a and the outer layer 41b satisfy the above ranges. Similarly, the outer layer 42b is preferably thicker than the inner layer 42a while the inner layer 42a and the outer layer 42b satisfy the above ranges.

The thickness of each ceramic layer in the side margin is an average value from measurements of the thickness of each ceramic layer in the side margin at multiple sites in the lamination (T) direction.

Specifically, the WT cross section is exposed at a substantially center along the length (L) direction of the multilayer ceramic capacitor, and is photographed using an optical microscope or an electronic microscope such that the ends of the first and second internal electrode layers in the width (W) direction and one of the side margins in the WT cross section appear in the same field of view. The sites to be photographed are an upper portion, a central portion, and a lower portion (three in total) in the lamination (T) direction. In the upper portion, central portion, and lower portion, multiple segments which are parallel or substantially parallel to the width (W) direction are drawn from the ends of the first and second internal electrode layers in the width (W) direction to the lateral surface of the laminate, and the length of each segment is measured. An average value from measurements of the segment length is calculated for each of the upper portion, central portion, and lower portion. These average values are further averaged, thus the thickness of each ceramic layer is determined.

The composition of the ceramic defining each ceramic layer in the side margin 41 may be different from the composition of the ceramic material defining the dielectric ceramic layers 20. In this case, the composition of the ceramic material defining at least one of the inner layer 41a or the outer layer 41b may be different from the composition of the ceramic material defining the dielectric ceramic layers 20.

Similarly, the composition of the ceramic material defining each ceramic layer in the side margin 42 may be different from the composition of the ceramic material defining the dielectric ceramic layers 20. In this case, the composition of the ceramic material defining at least one of the inner layer 42a or the outer layer 42b may be different from the composition of the ceramic material defining the dielectric ceramic layers 20.

Method of Producing Multilayer Ceramic Capacitor

A method of producing the multilayer ceramic capacitor according to a preferred embodiment of the present invention preferably includes preparing a green chip having a laminated structure including multiple dielectric ceramic layers and multiple pairs of a first internal electrode layer and a second internal electrode layer in a raw state in which the first internal electrode layers and the second internal electrode layers are exposed to a first lateral surface and a second lateral surface that oppose each other in a width direction perpendicular or substantially perpendicular to a lamination direction, producing a raw laminate by forming a raw side margin on each of the first lateral surface and the second lateral surface of the green chip, and sintering the raw laminate, wherein the producing the raw laminate includes forming a raw inner layer on each of the first lateral surface and the second lateral surface and forming a raw outer layer on the outermost side of each of the first lateral surface and the second lateral surface, such that the raw side margins are formed.

The following describes an example of a method of producing the multilayer ceramic capacitor 1 shown in FIG. 1.

First, a ceramic green sheet that turns into the dielectric ceramic layers 20 is prepared. The ceramic green sheet includes ceramic raw materials that include the dielectric ceramic material, and components such as a binder and a solvent, for example. The ceramic green sheet is formed on a carrier film using a coater such as a die coater, a gravure coater, or a micro gravure coater, for example.

Figure 7A:
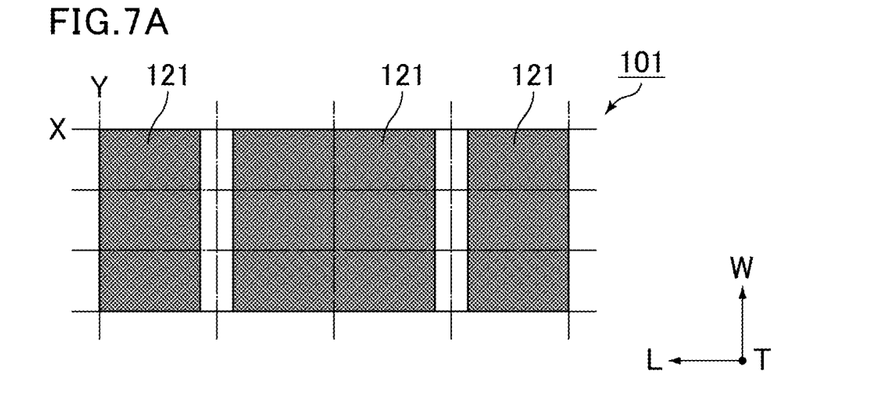
FIGS. 7A to 7C are plan views each schematically showing an example of a ceramic green sheet.
Figure 7B:
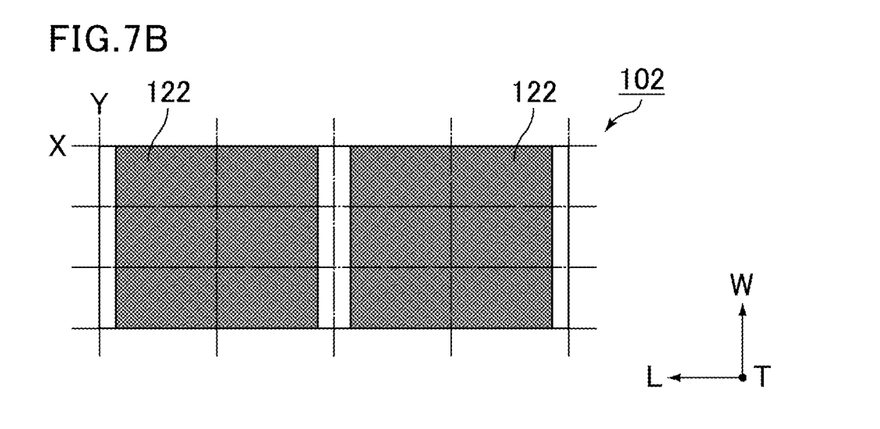
Figure 7C:
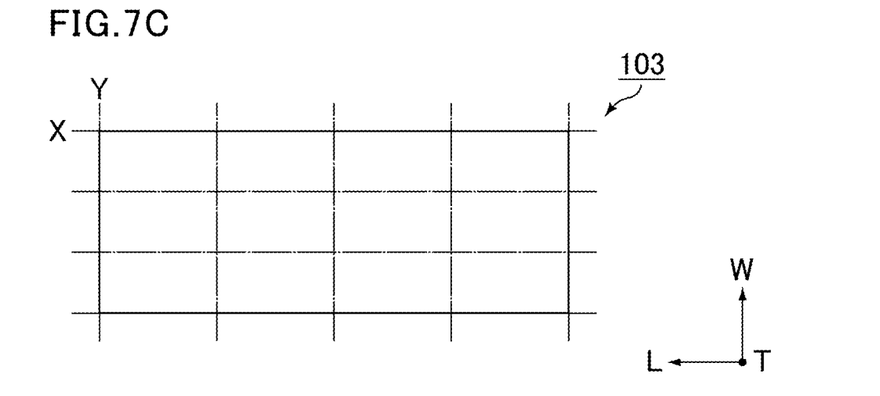

FIGS. 7A to 7C are plan views each schematically showing an example of a ceramic green sheet.

FIGS. 7A to 7C respectively show a first ceramic green sheet 101 for forming the central layer portion 30, a second ceramic green sheet 102 for forming the central layer portion 30, and a third ceramic green sheet 103 for forming the peripheral layer portion 31 or 32.

In FIGS. 7A to 7C, the first ceramic green sheet 101, the second ceramic green sheet 102, and the third ceramic green sheet 103 are not cut by each multilayer ceramic capacitor 1. FIGS. 7A to 7C show cutting lines X and Y for cutting the green sheets by each multilayer ceramic capacitor 1. The cutting lines X are parallel or substantially parallel to the length (L) direction, and the cutting lines Y are parallel or substantially parallel to the width (W) direction.

As shown in FIG. 7A, raw first internal electrode layers 121 corresponding to the first internal electrode layers 21 are formed on the first ceramic green sheet 101. As shown in FIG. 7B, raw second internal electrode layers 122 corresponding to the second internal electrode layers 22 are formed on the second ceramic green sheet 102. As shown in FIG. 7C, the raw internal electrode layers 121 or 122 are not formed on the third ceramic green sheet 103 corresponding to the peripheral layer portion 31 or 32.

The first internal electrode layers 121 and the second internal electrode layers 122 can be formed using any conductive paste. A method such as screen printing or gravure printing can be used, for example, to form the first internal electrode layers 121 and the second internal electrode layers 122 with conductive paste.

The first internal electrode layers 121 and the second internal electrode layers 122 are each disposed over two regions adjacent to each other in the length (L) direction divided by the cutting lines Y, and extend in a band shape in the width (W) direction. The first internal electrode layer 121 and the second internal electrode layer 122 are in a positional relationship such that the regions partitioned by the cutting lines Y are shifted column by column in the length (L) direction. In other words, a cutting line Y passing through the center of each first internal electrode layer 121 passes through a region between the second internal electrode layers 122, and a cutting line Y passing through the center of the second internal electrode layer 122 passes through a region between the first internal electrode layers 121.

Subsequently, the first ceramic green sheets 101, the second ceramic green sheets 102, and the third ceramic green sheets 103 are laminated together to produce a mother block.

Figure 8:
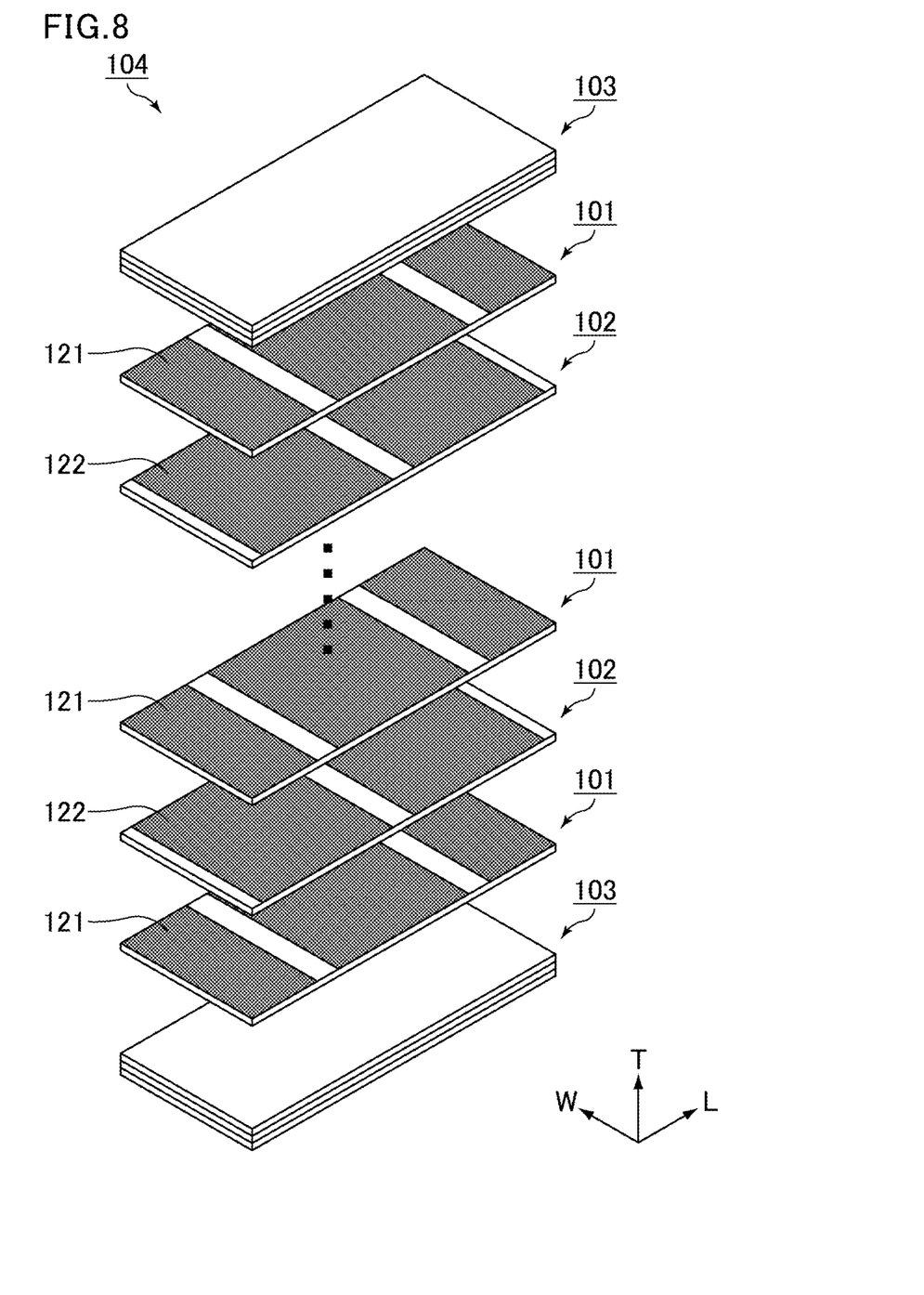
FIG. 8 is an exploded perspective view schematically showing an example of a mother block.

FIG. 8 is an exploded perspective view schematically showing an example of a mother block.

For the sake of description, FIG. 8 shows an exploded view of the first ceramic green sheets 101, the second ceramic green sheets 102, and the third ceramic green sheets 103. In an actual mother block 104, the first ceramic green sheets 101, the second ceramic green sheets 102, and the third ceramic green sheets 103 are compressed and integrated together by, for example, isostatic pressing.

In the mother block 104 shown in FIG. 8, the first ceramic green sheets 101 and the second ceramic green sheets 102 corresponding to the central layer portion 30 are alternately laminated in the lamination (T) direction. Further, the third ceramic green sheets 103 corresponding to the peripheral layer portions 31 and 32 are laminated on the top and bottom surfaces in the lamination (T) direction of the laminate of the first ceramic green sheets 101 and the second ceramic green sheets 102 which are alternately laminated. While FIG. 8 shows three third ceramic green sheets 103 laminated on each of the top and bottom surfaces, the number of the third ceramic green sheets 103 can be suitably varied.

The resulting mother block 104 is cut along the cutting lines X and Y (see FIGS. 7A to 7C), such that multiple green chips are produced. A method such as, for example, dicing, force-cutting, or laser cutting may suitably be used for the cutting.

Figure 9:
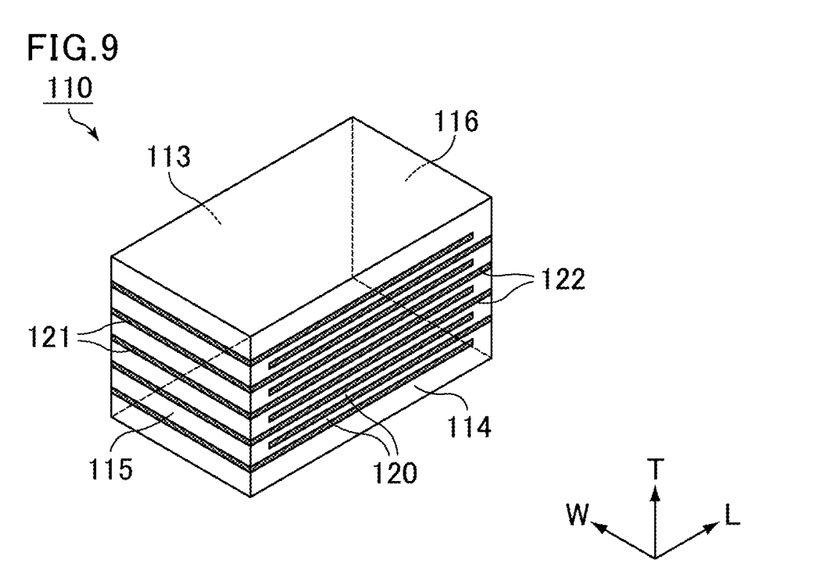
FIG. 9 is a perspective view schematically showing an example of a green chip.

FIG. 9 is a perspective view schematically showing an example of a green chip.

A green chip 110 shown in FIG. 9 has a laminated structure including multiple dielectric ceramic layers 120 and multiple pairs of the first internal electrode layers 121 and the second internal electrode layers 122 in a raw state. A first lateral surface 113 and a second lateral surface 114 of the green chip 110 are surfaces obtained by cutting along a cutting line X, and a first end surface 115 and a second end surface 116 are surfaces obtained by cutting along a cutting line Y. The first internal electrode layers 121 and the second internal electrode layers 122 are exposed on the first lateral surface 113 and the second lateral surface 114. Only the first internal electrode layers 121 are exposed on the first end surface 115, and only the second internal electrode layers 122 are exposed on the second end surface 116.

Raw side margins are formed on the first lateral surface 113 and the second lateral surface 114 of the green chip 110, such that a raw laminate is produced. The raw side margins are formed, for example, by bonding side margin ceramic green sheets to the first lateral surface and the second lateral surface of the green chip.

For example, when the side margin includes two layers including the inner layer and the outer layer, first, to produce an inner layer ceramic green sheet, ceramic slurry is produced which includes ceramic raw materials that include a dielectric ceramic material mainly including $BaTiO_3$ or the like and components such as a binder and a solvent, for example. Si that defines and functions as a sintering aid may be added to an inner layer ceramic slurry. The inner layer defines and functions as an adhesive to the green chip 110.

Next, to produce an outer layer ceramic green sheet, ceramic slurry is produced which includes ceramic raw materials that include a dielectric ceramic material mainly including $BaTiO_3$ or the like and components such as a binder and a solvent, for example. Si that defines and functions as a sintering aid may be added to an outer layer ceramic slurry. The amount of Si in the inner layer ceramic green sheet is preferably larger than the amount of Si in the outer layer ceramic green sheet. Each amount of Si is determined from the size of an area where Si is detected that is obtained by photographing the cross section of each sheet by WDX.

The outer layer ceramic slurry is applied to the surface of a resin film and dried, such that an outer layer ceramic green sheet is formed. The inner layer ceramic slurry is applied to the surface of the outer layer ceramic green sheet on the resin film and dried, such that an inner layer ceramic green sheet is formed. Thus, a side margin ceramic green sheet having a two-layered structure is obtained.

The side margin ceramic green sheet having a two-layered structure can also be obtained, for example, by forming the outer layer ceramic green sheet and the inner layer ceramic green sheet in advance and bonding them together. The structure of the side margin ceramic green sheet is not limited to the two-layered structure, and may be a three- or more layered structure.

Then, the side margin ceramic green sheet is separated from the resin film.

Subsequently, the inner layer ceramic green sheet of the side margin ceramic green sheet is disposed to oppose the first lateral surface 113 of the green chip 110, and press-punched, such that the raw side margin 41 is formed. Further, the inner layer ceramic green sheet of the side margin ceramic green sheet is disposed to oppose the second lateral surface 114 of the green chip 110, and press-punched, such that the raw side margin 42 is formed. Here, an organic solvent that defines and functions as an adhesive is preferably applied to the lateral surface of the green chip in advance. Thus, the raw laminate is obtained.

It is preferable that the raw laminate obtained by the above-described method is subjected to barrel polishing or the like. The corners and edges of the sintered laminate 10 are rounded by polishing the raw laminate.

Next, in the raw laminate, a conductive paste for the external electrodes including Ni and a ceramic material is applied to each end surface of the first end surface 115 and the second end surface 116 of the green chip 110.

It is preferable that the conductive paste for the external electrodes includes, as a ceramic material, the same dielectric ceramic material as the outer-layer ceramic green sheet or the ceramic slurry for the outer layers. The content of the ceramic material in the conductive paste for the external electrodes is preferably about 15 wt % or more, for example. Furthermore, the content of the ceramic material in the conductive paste for external electrodes is preferably about 25 wt % or less, for example.

Next, the raw laminate to which the conductive paste for the external electrodes has been applied is subjected to, for example, a degreasing treatment under a predetermined condition in a nitrogen atmosphere, and then sintered at a predetermined temperature in a nitrogen-hydrogen-steam mixed atmosphere. As a result, the raw laminate and the conductive paste for the external electrodes are simultaneously sintered, and the laminate 10, the Ni layer to be connected to the first internal electrode layer 21, and the Ni layer to be connected to the second internal electrode layer 22 are simultaneously formed by a co-fire method. Thereafter, a first plating layer obtained by Ni plating and a second plating layer obtained by Sn plating are sequentially laminated on the surface of each of the Ni layers. As a result, the first external electrode 51 and the second external electrode 52 are formed.

The multilayer ceramic capacitor 1 is produced as described above.

The raw side margin may be formed by bonding the side margin ceramic green sheet or applying the side margin ceramic slurry to each lateral surface of the green chip.

When the raw side margin is formed by applying the side margin ceramic slurry, the inner layer ceramic slurry is applied to each lateral surface of the green chip, and dried. Further, the outer layer ceramic slurry is applied to the surface of the resulting inner layer.

Alternatively, the side margin may be formed by masking both end surfaces of the green chip with resin or the like, dipping the green chip entirely into the inner layer ceramic slurry, drying the green chip, and further dipping the green ship into the outer layer ceramic slurry. In this case, the inner layer and the outer layer are also formed on the peripheral layer portion, resulting in a three-layered structure.

In the present preferred embodiment, the mother block 104 is cut along the cutting lines X and Y to produce multiple green chips, and the raw side margin is formed on each lateral surface of the green chip. Yet, the present preferred embodiment may be modified as follows.

Specifically, the mother block is cut only along the cutting lines X to produce multiple rod-shaped green blocks in which the first internal electrode layers and the second internal electrode layers are exposed to lateral surfaces that appear by the cutting along the cutting lines X. Then, the raw side margins are formed on the lateral surfaces of each green block, and the green blocks are cut along the cutting lines Y to produce multiple raw laminates, followed by sintering the raw laminates. After sintering, the same steps as in the preferred embodiment described above are performed, such that multilayer ceramic capacitors can be produced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a laminate including a dielectric ceramic layer and an internal electrode layer that are laminated in a lamination direction; and
    an external electrode connected to the internal electrode layer; wherein
    the laminate includes a first main surface and a second main surface that oppose each other in the lamination direction, a first lateral surface and a second lateral surface that oppose each other in a width direction perpendicular or substantially perpendicular to the lamination direction, and a first end surface and a second end surface that oppose each other in a length direction perpendicular or substantially perpendicular to the lamination direction and the width direction;
    the internal electrode layer includes a first internal electrode layer extending to the first end surface and a second internal electrode layer extending to the second end surface so as to oppose the first internal electrode layer with the dielectric ceramic layer therebetween;
    the external electrode includes a first external electrode disposed on the first end surface and connected to the first internal electrode layer, and a second external electrode disposed on the second end surface and connected to the second internal electrode layer;
    the laminate includes a central layer portion in which the first internal electrode layer and the second internal electrode layer are alternately laminated with the dielectric ceramic layer therebetween, a peripheral layer portion sandwiching the central layer portion in the lamination direction and made of a ceramic material, and a side margin sandwiching the central layer portion and the peripheral layer portion in the width direction and made of a ceramic material;
    the side margin includes an inner layer on an innermost side in the width direction and an outer layer on an outermost side in the width direction;
    the first internal electrode layer, the second internal electrode layer, the first external electrode, and the second external electrode include Ni;
    the first external electrode is disposed on the first end surface and extends therefrom on the first main surface, the second main surface, the first lateral surface, and the second lateral surface; and in a cross section including the lamination direction and the width direction which is obtained by cutting the laminate and the first external electrode at a central portion in a length direction of an extending portion of the first external electrode which extends on the first main surface, a Ni content of the peripheral layer portion is larger at a surface portion in a thickness direction of the peripheral layer portion than a Ni content at a central portion in the thickness direction of the peripheral layer portion, and a Ni content of the side margin is larger at a surface portion in a thickness direction of the side margin than a Ni content at a central portion in the thickness direction of the side margin.

2. The multilayer ceramic capacitor according to claim 1, wherein each of the first external electrode and the second external electrode includes a Ni layer including Ni and a ceramic material disposed directly on the laminate, and an element included in the ceramic material is the same or substantially the same as an element included in a ceramic material included in the outer layer.

3. The multilayer ceramic capacitor according to claim 2, wherein the ceramic material is present in the Ni layer in an amount of about 25 area % or more and about 40 area % or less.

4. The multilayer ceramic capacitor according to claim 2, wherein the ceramic material is present in the Ni layer in an amount of about 25 area % or more and about 35 area % or less.

5. The multilayer ceramic capacitor according to claim 2, wherein each of the first and second external electrodes includes the Ni layer, a first plating layer, and a second plating layer in order.

6. The multilayer ceramic capacitor according to claim 5, wherein the first plating layer is a Ni plating layer and the second plating layer is an Sn plating layer.

7. The multilayer ceramic capacitor according to claim 1, wherein the first internal electrode layer and the second internal electrode layer each have a thickness of about 0.4 µm or less.

8. The multilayer ceramic capacitor according to claim 7, wherein the first internal electrode layer and the second internal electrode layer each have a thickness of about 0.38 µm or less.

9. The multilayer ceramic capacitor according to claim 1, wherein the dielectric ceramic layer has a thickness of about 0.55 µm or less.

10. The multilayer ceramic capacitor according to claim 1, wherein the dielectric ceramic layer mainly includes $BaTiO_3$.

11. The multilayer ceramic capacitor according to claim 1, wherein the peripheral layer portion has a thickness of about 15 µm or more and about 40 µm or less.

12. The multilayer ceramic capacitor according to claim 1, wherein the first internal electrode layer and the second internal electrode layer each have a thickness of about 0.25 µm or less.

13. The multilayer ceramic capacitor according to claim 1, wherein the dielectric ceramic layer has a thickness of about 0.4 µm or less.

14. The multilayer ceramic capacitor according to claim 1, wherein the inner layer is thinner than the outer layer.

15. The multilayer ceramic capacitor according to claim 14, wherein the inner layer has a thickness of about 0.1 µm or more and about 20 µm or less.

16. The multilayer ceramic capacitor according to claim 14, wherein the outer layer has a thickness of about 5 µm or more and about 20 µm or less.

17. The multilayer ceramic capacitor according to claim 1, wherein the side margin has a thickness of about 5 µm or more and about 40 µm or less.

18. The multilayer ceramic capacitor according to claim 1, wherein the side margin has a thickness of about 5 µm or more and about 20 µm or less.

* * * * *